US008606765B2

(12) United States Patent  (10) Patent No.: US 8,606,765 B2
Boggs et al. (45) Date of Patent: Dec. 10, 2013

(54) SYSTEMS AND METHODS FOR UPDATING SOFTWARE APPLIANCES

(75) Inventors: Joseph Boggs, Fayetteville, NC (US); Norman Lee Faus, Raleigh, NC (US); David Huff, Raleigh, NC (US); Bryan Kearney, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1161 days.

(21) Appl. No.: 11/948,992

(22) Filed: Nov. 30, 2007

(65) Prior Publication Data

US 2009/0144718 A1 Jun. 4, 2009

(51) Int. Cl.
*G06F 7/00* (2006.01)
*G06F 17/00* (2006.01)
*G06F 9/44* (2006.01)

(52) U.S. Cl.
USPC .......................................... 707/695; 717/170

(58) Field of Classification Search
None
See application file for complete search history.

(56) References Cited

U.S. PATENT DOCUMENTS

| | | | | |
|---|---|---|---|---|
| 6,367,077 | B1 * | 4/2002 | Brodersen et al. | 717/170 |
| 6,578,199 | B1 | 6/2003 | Tsou et al. | |
| 7,461,095 | B2 * | 12/2008 | Cohen et al. | 1/1 |
| 7,624,394 | B1 * | 11/2009 | Christopher, Jr. | 717/177 |
| 2002/0069213 | A1 * | 6/2002 | Moslander et al. | 707/203 |
| 2002/0086688 | A1 * | 7/2002 | Kang | 455/466 |
| 2002/0129352 | A1 * | 9/2002 | Brodersen et al. | 717/174 |
| 2004/0044998 | A1 * | 3/2004 | Wildhagen et al. | 717/170 |
| 2004/0193953 | A1 * | 9/2004 | Callahan et al. | 714/15 |
| 2004/0210893 | A1 * | 10/2004 | Chamberlain et al. | 717/168 |
| 2005/0044541 | A1 * | 2/2005 | Parthasarathy et al. | 717/173 |
| 2005/0273779 | A1 * | 12/2005 | Cheng et al. | 717/168 |
| 2006/0041881 | A1 * | 2/2006 | Adkasthala | 717/168 |
| 2006/0236228 | A1 * | 10/2006 | Michelstein et al. | 715/513 |
| 2007/0074201 | A1 * | 3/2007 | Lee | 717/173 |
| 2007/0169079 | A1 * | 7/2007 | Keller et al. | 717/168 |
| 2007/0245332 | A1 * | 10/2007 | Tal et al. | 717/168 |
| 2008/0022271 | A1 * | 1/2008 | D'Angelo et al. | 717/168 |
| 2008/0052384 | A1 | 2/2008 | Marl et al. | |
| 2008/0077605 | A1 * | 3/2008 | Vasu | 707/101 |
| 2009/0064086 | A1 | 3/2009 | Faus | |
| 2009/0222805 | A1 | 9/2009 | Faus | |
| 2009/0222806 | A1 | 9/2009 | Faus | |
| 2009/0222808 | A1 | 9/2009 | Faus | |
| 2009/0249488 | A1 | 10/2009 | Robinson et al. | |
| 2009/0300164 | A1 | 12/2009 | Boggs | |
| 2009/0300584 | A1 | 12/2009 | Faus | |
| 2009/0300593 | A1 | 12/2009 | Faus | |
| 2009/0300601 | A1 | 12/2009 | Faus | |
| 2010/0049736 | A1 * | 2/2010 | Rolls et al. | 707/103 R |

* cited by examiner

*Primary Examiner* — Uyen Le
(74) *Attorney, Agent, or Firm* — Lowenstein Sandler LLP

(57) ABSTRACT

Embodiments relate to systems and methods for updating software appliances. A client can host a software appliance, such a Linux™ software appliance, which a user wishes to update to a newer version. Instead of performing an in-place update by installing a new version that deletes the configuration state and/or user data of the existing version of the appliance, an export module takes an image of an initial appliance installation and then registers further changes to the configuration state and/or user data over time. When the user chooses to update the software appliance, the new version can be downloaded to execute an installation. The export module aggregates all changes to the original installation image as well as user data, and delivers the complete current configuration state and/or complete current user data to the new version of the appliance to instantiate the new version.

23 Claims, 4 Drawing Sheets

SYSTEMS AND METHODS FOR UPDATING SOFTWARE APPLIANCES

FIELD

The present invention relates to systems and methods for updating software appliances, and more particularly to platforms and techniques for migrating the configuration state and user data to a new version an appliance.

BACKGROUND OF RELATED ART

Software appliances can consist of a software package in which services and user interfaces (UIs) run on top of an operating system such as Linux™, to provide support for a top-level application. Software appliances can be provided for download over the Internet by independent software vendors (ISVs) or other sources. Users of a given software appliance may eventually decide to upgrade or update the appliance to a newer version.

Performing an appliance update to install the new version can pose difficulties to the user. A user can for instance download an executable file to perform an in-place installation of the new version of an appliance. The new version is extracted and installed over the old version. In the process of installation, the configuration state of the old version is lost. That is, the user's chosen preferences and configuration data is wiped out, leaving the new version in a default configuration that does not incorporate all the user settings from the old version of the software appliance. The new version instead reverts to a default configuration state. The user must then go back to manually reconfigure the new version of the appliance to duplicate the settings the user had developed on the old version. This may also be attempted by running a restore operation from a streaming backup tape, which in some facilities can take days of time. In addition, the accumulated user data produced by the user operating the old version can be lost upon installation of the new appliance. Alternatively, the new version of the software appliance can attempt to import the previously existing user data files, but in the event that the data schema of the new version has changed compared to the old version, there may be incompatibilities when attempting to recover or operate on that data. It may be desirable to provide methods and systems for updating software appliances that overcome these and other problems in the art.

DESCRIPTION OF THE DRAWINGS

The accompanying drawings, which are incorporated in and constitute a part of this specification, illustrate embodiments of the present teachings and together with the description, serve to explain the principles of the invention. In the figures.

DESCRIPTION OF EMBODIMENTS

Embodiments of the present teachings relate to systems and methods for updating software appliances. More particularly, embodiments relate to a platform and techniques for updating software appliances without performing an in-place update that would destroy the current configuration and user data set of an existing version of the software appliance. An export module can take an image of an initial installation of a software appliance, including its base configuration state and any initial user data. The export module registers all subsequent changes to the configuration state and user data stored by the software appliance. When a user decides to update the software appliance to a new version, the export module aggregates all changes to the configuration state, and instantiates the new version of the software appliance to incorporate that complete current configuration state in the new version. The export module also extracts the user data produced or stored in the old version, and exports the complete set of current user data to the new version of the software appliance. In embodiments, the export module determines the data schema used in the new version of the software appliance, and if that schema differs from the schema of the user data stored in or by the old version, conforms the imported data to the new schema. After the new version of the software appliance is fully instantiated, configured, and loaded with user data in an appropriate schema, the export module begins to track changes to the configuration state and user data for the new version, to export in the event of updating to a further updated version at a later time.

Reference will now be made in detail to exemplary embodiments of the invention, which are illustrated in the accompanying drawings. Where possible the same reference numbers will be used throughout the drawings to refer to the same or like parts.

Figure 1:
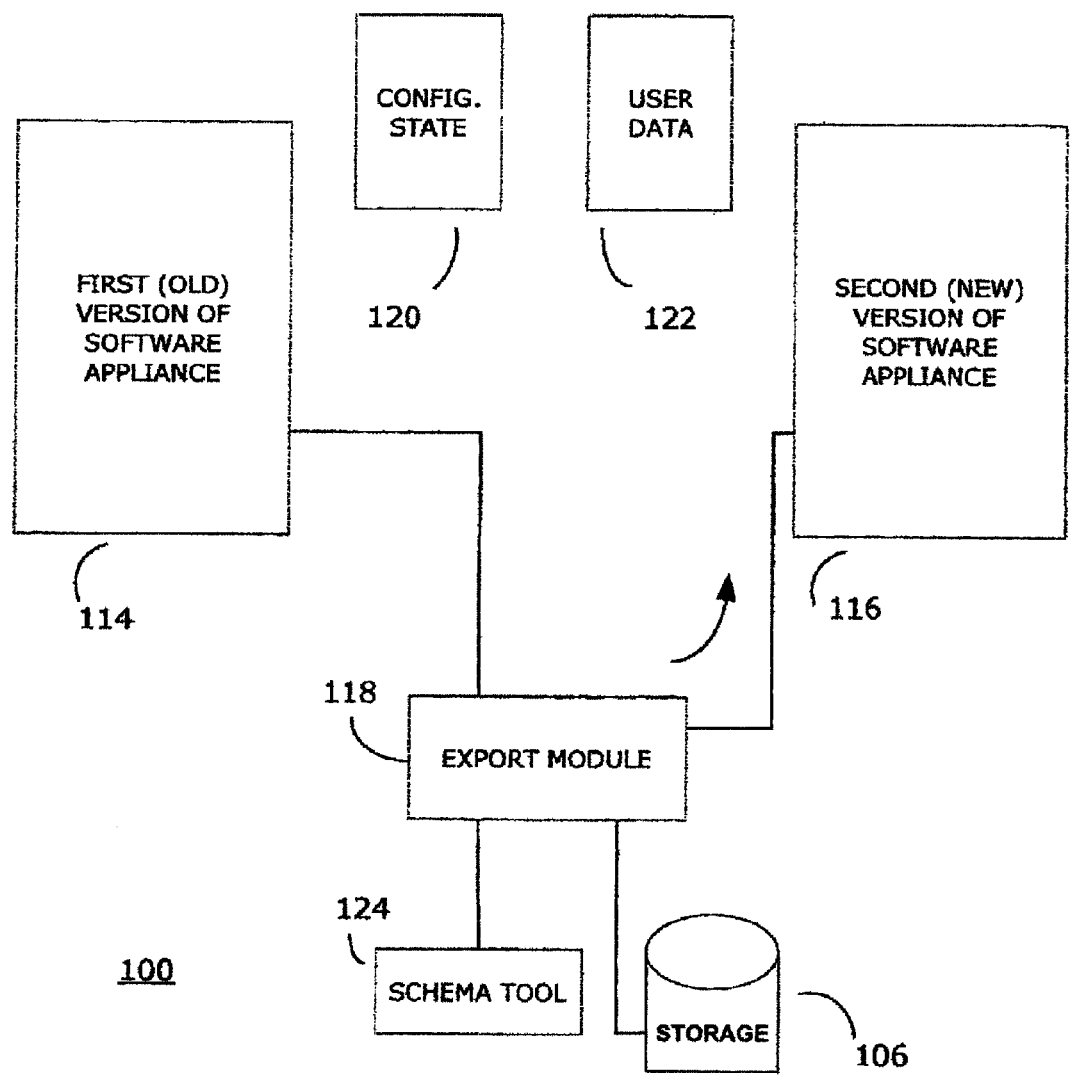
FIG. 1 illustrates an overall system for updating software appliances, according to various embodiments of the present teachings.

FIG. 1 illustrates a schematic system 100 that is consistent with various embodiments of the present teachings. The system 100 can comprise an export module 118 that interacts with a first version of a software appliance 114, and a second version of software appliance 116. In general, first version of software appliance 114 and second version of software appliance 116 represent different versions of the same general software appliance, with second version of software appliance 116 being an update or upgrade to first version of software appliance 114. The first version of software appliance 114 and second version of software appliance 116 can each consist of a base-level operating system kernel such as Linux™ or components of that operating system, along with services and user interfaces (UIs) executing on top of those operating system resources. The first version of software appliance 114 and second version of software appliance 116 can each also comprise a top-level application that makes calls to operating system resources through the intermediate services and UIs, to present an application to the user. First version of software appliance 114 and second version of software appliance 116 can each be, for example, a spreadsheet appliance, an email appliance, a document processing appliance, an instant message appliance, or other types of software appliances. The old and new versions of the software appliances can run on a client machine, such as a personal computer, a network-enabled cellular telephone, a personal media player, or other device.

The export module 118 operates to register the operating condition of first version of software appliance 114, to permit a seamless update to second version of software appliance 116 without destroying or overwriting the configuration state and user data of the old version (first version of software appliance 114) in the process of acquiring and instantiating the new version (second version of software appliance 116). More particularly as shown, export module 118 communicates with an appliance configuration state 120 and a set of user data 122. The configuration state 120 can include a data store of the parameters and settings of first version of software appliance 114 accumulated over time. The configuration state 120 can represent the parameters, settings, and operational parameters accumulated over time that control the operation of first version of software appliance 114. For instance, in the case where first version of software appliance 114 is a Web browser, configuration state 120 can include information such as the designated home page of the browser, the language in which the browser is presented, the set of plug-ins presently installed in the browser, a set of browser favorites, or other parameters and settings. The configuration state 120 can include settings selected by the user, as well as settings or data automatically configured or set to defaults by first version of software appliance 114. The user data 122 can comprise information or data inputted by the user for use in first version of software appliance 114, such as a contact list, a media play list, spreadsheet or document files, or other user data. Export module 118 can store the configuration state 120 and/or user data 122 to local storage 106, such as a local hard disk, optical disk, electronic memory or other storage.

The export module 118 executes logic to track and instantiate second version of software appliance 116 from the registered configuration state 120 and user data 122 stored for first version of software appliance 114. More particularly, when the original version of the subject software appliance, first version of software appliance 114, is installed, export module 118 captures an image of first version of software appliance 114 containing the configuration state 120 and user data 122, if any, imported during installation. Export module 118 then polls or interrogates the first version of software appliance 114 at regular or other intervals, to identify and store any changes to the configuration state 120 and/or user data 122 associated with that appliance. For instance, export module 118 can poll or interrogate first version of software appliance 114 every hour, day, or at other intervals to determine incremental changes to the configuration or user data of first version of software appliance 114. For example, in the case of first version of software appliance 114 that is a Web browser, if the user changes the designated home page for the appliance, export module 118 registers that change to the stored configuration state 120. In part because export module 118 maintains the recorded updates on an incremental and rolling basis, export module 118 is always aware of the most recent or most nearly recent state of first version of software appliance 114 and its data.

When the user elects to update the first version of software appliance 114, the user can acquire second version of software appliance 116 by download or other channels. When the user begins to install second version of software appliance 116, export module 118 can aggregate the incremental changes to the configuration state 120 and/or user data 122 stored in storage 106 to produce a complete and up-to-date image of the first version of software appliance 114. Export module 118 can then take an image of the initial configuration state 120 and/or any preloaded user data 122 present in the newly instantiated second version of software appliance 116, to begin the downstream processing of tracking the newly instantiated appliance for later updates.

Export module 118 then aggregates the changes to the configuration state 120 and/or user data 122 for first version of software appliance 114 to prepare to configure second version of software appliance 116. In embodiments as shown, export module 118 examines the data schema for any data to be populated in second version of software appliance 116. Export module 118 can invoke schema tool 124 to determine whether the data schema extracted from user data 122 of first version of software appliance 114 is compatible with the schema of second version of software appliance 116. If the data schema does not match, for example, the number of columns of a spreadsheet does not match the required number in the schema for second version of software appliance 116, schema tool 124 can pre-fill extra columns with null values. In embodiments, schema tool 124 can follow predetermined rules to conform the schema of data exported from first version of software appliance 114 to second version of software appliance 116. In embodiments, schema tool 124 can instead or also present a query dialog to the user to prompt for the user's selected preference to adjust data schemas or values. Export module 118 can then store the configuration state 120 and user data 122 for each of first version of software appliance 114 and second version of software appliance 116 to storage 106. Once the installation and configuration of second version of software appliance 116 with its accompanying user data 122 is complete, export module 118 can store, delete, or archive first version of software appliance 114. Export module 118 in this matter accomplishes a complete migration of all configuration states and user data to second version of software appliance 116, without destroying the legacy states or appliance. User convenience in conducting appliance updates can thereby be enhanced.

Figure 2:
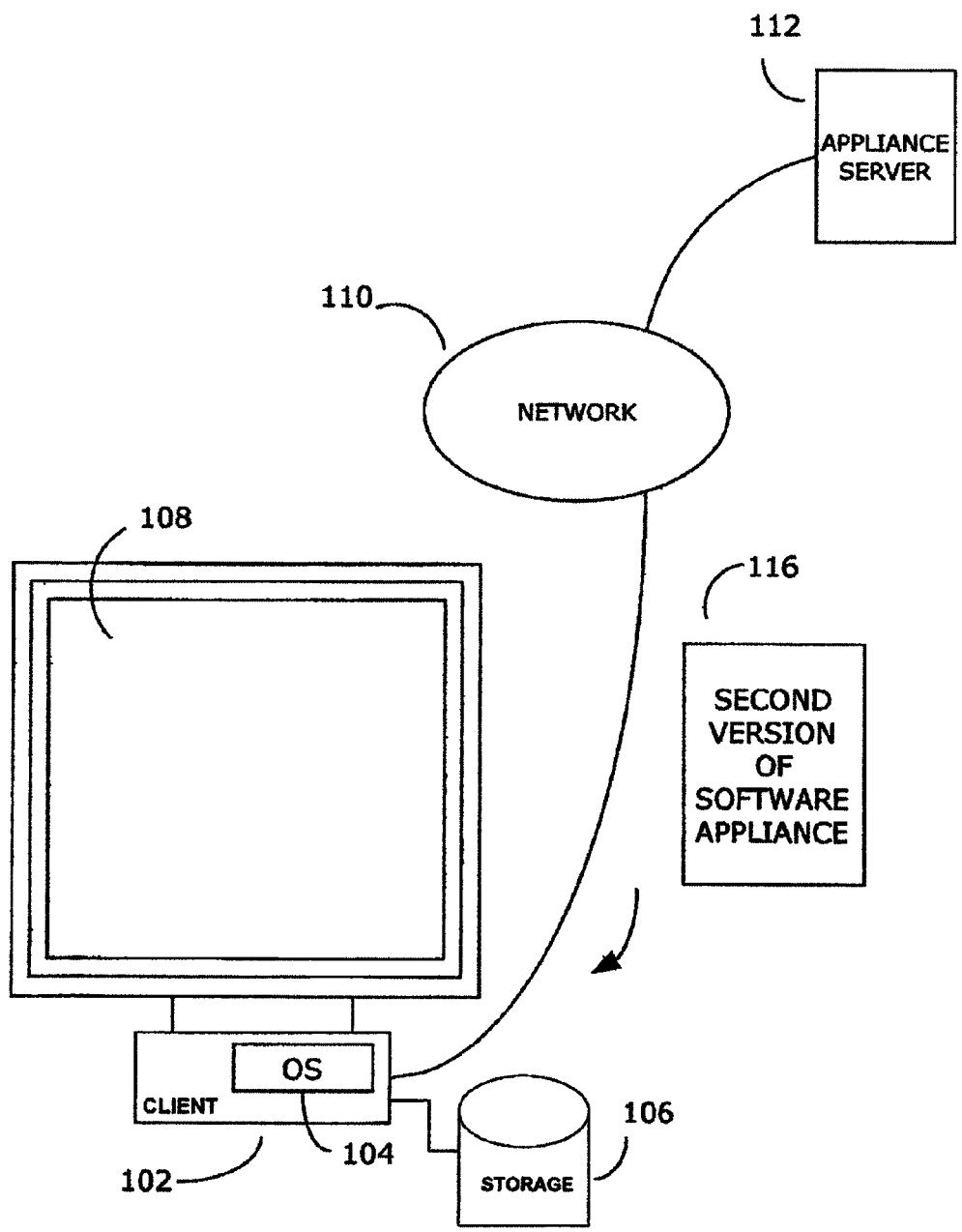
FIG. 2 illustrates a network configuration in which systems and methods for updating software appliances can operate, according to various embodiments.

FIG. 2 illustrates a networked system configuration in which systems and methods for updating software appliances according to the present teachings can operate. A user can operate client 102, such as a personal computer, network-enabled cellular telephone, personal media device, or other device to acquire and update one or more software appliances. Client 102 can host an operating system 104, such as a distribution of the Linux™ operating system, the Windows™ family of operating systems, or others. Client 102 can incorporate storage 106, such as a local hard disk drive, optical drive, electronic memory or flash drive, or other storage. Client 102 can include a user interface 108, such as a desktop or other graphical user interface, a command line interface, or other interface.

Client 102 can communicate with network 110, such as the Internet or other public or private networks, to communicate with appliance server 112. Appliance server 112 can host and serve one or more software appliances to client 102. Appliance server 112 can be maintained by an ISV or other organization or entity. Appliance server 112 can, more particularly, serve first version of software appliance 114 and/or second version of software appliance 116 to client 102 for installation and configuration. In embodiments, first version of software appliance 114 and/or second version of software appliance 116 can be distributed to client 102 via other channels, such as mailing of CD-ROM or other media. In embodiments, second version of software appliance 116 can be automatically distributed or prompted to client 102 using an update notification service.

Figure 3:
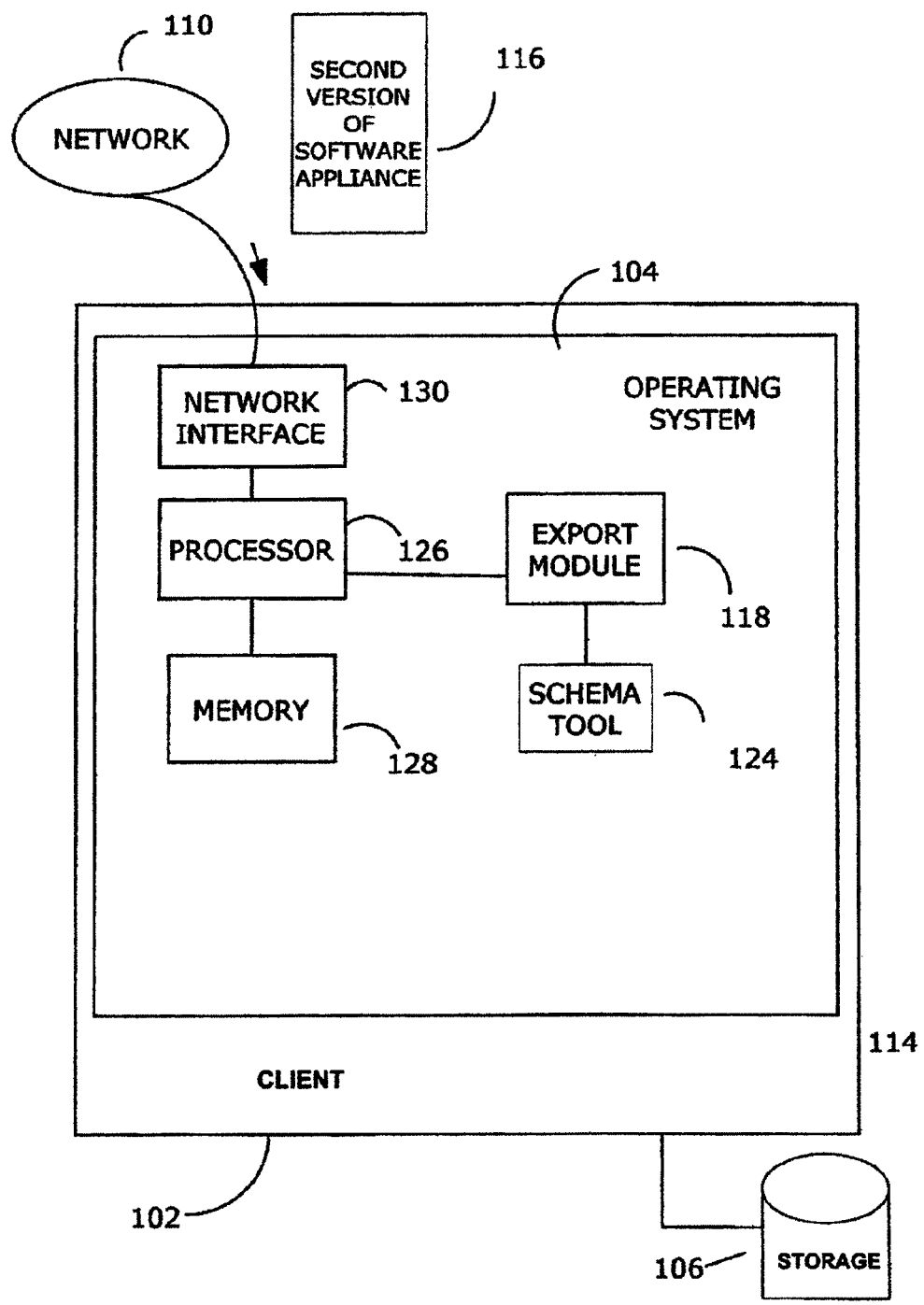
FIG. 3 illustrates a hardware configuration of an export module and other elements for updating software appliances, according to various embodiments.

FIG. 3 illustrates a hardware configuration for export module 118 and related resources, according to embodiments. A processor 126 can communicate with memory 128 of client 102 under control of operating system 104. Processor 126 can communicate with network interface 130, for instance, an Ethernet, fiber optic, or other interface, to connect to network 110 such as the Internet, or other public or private networks. Export module 118 can communicate with processor 126 and operating system 104 to access system services, for instance to store configuration state 120 and user data 122 to storage 106, such as a local hard disk or other storage.

Figure 4:
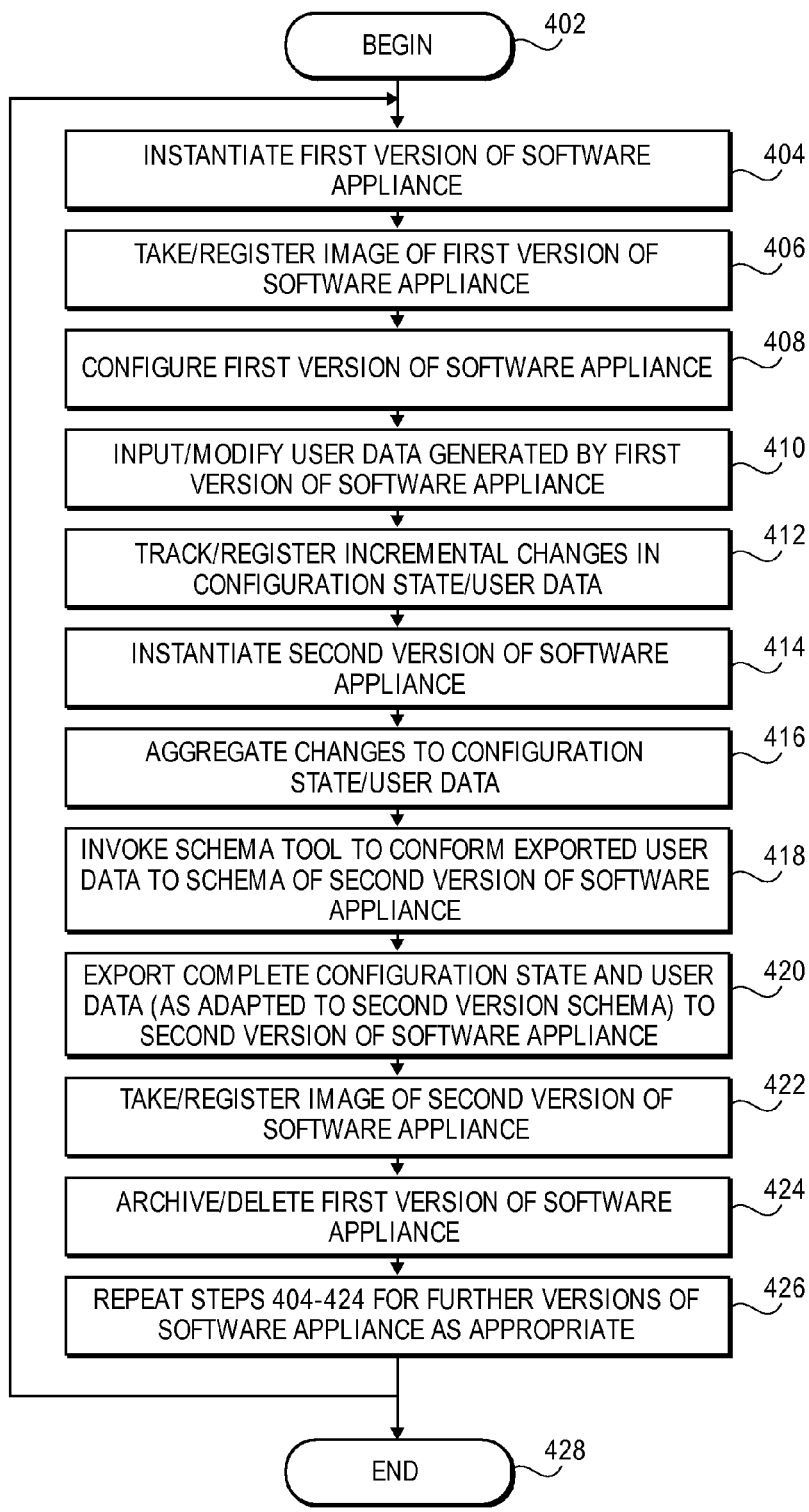
FIG. 4 illustrates a flowchart of overall software appliance updating, according to various embodiments.

FIG. 4 illustrates overall processing to perform software appliance updating, according to embodiments. In step 402, processing can begin. In step 404, a first version of software appliance 114 can be instantiated by a user under the operating system 104 of client 102. In step 406, the export module 118 can capture an image of the initial configuration and any loaded user data in the first version of software appliance 114. In step 408, the first version of software appliance 114 can be configured, for example by user selection of various settings or options. In step 410, user data 122 can be generated, stored, or modified by first version of software appliance 114, for instance by accessing storage 106. In step 412, export module 118 tracks and registers changes to the configuration state 120 and/or user data 122 associated with first version of software appliance 114. Export module 118 can for example store that information to storage 106 or to another local or remote data store.

In step 414, the second version of software appliance 116 can be instantiated by a user under the operating system 104 of client 102. A user can for example download second version of software appliance 116 from appliance server 112 via network 110, and click on or activate an executable download file. In step 416, the collective changes to the configuration state 120 and/or user data 122 registered by export module 118 can be accumulated to produce an initial configuration state 120 and set of user data 122 for the second version of software appliance 116.

In step 418, a schema tool 124 can be invoked by export module 118 to verify that the user data 122 to be loaded into the initial state of second version of software appliance 116 conforms to the necessary data structure of the second version of software appliance 116. For example, if the set of user data 122 exported from first version of software appliance 114 includes a database containing five columns, and the second version of software appliance 116 is configured to accept a database containing seven columns, schema tool 124 can automatically fill two extra columns of user data 122 exported from first version of software appliance 114 with null values. In embodiments, schema tool 126 can present a query dialog to the user to specify values or parameters to be inserted or used to adapt the schema of user data 122 extracted from first version of software appliance 114 to the schema of second version of software appliance 116.

In step 420, the export module 118 exports the configuration state 120 and user data 122, after any necessary schema conversion, to the second version of software appliance 116. In step 422, export module 118 takes an image of the initial configuration and user data loaded into second version of software appliance 116. In step 424, export module 118 can store, archives or delete first version of software appliance 114 after successful completion of the update process to instantiate, configure, and load second version of software appliance 116. In step 426, steps 404-424 can be repeated for additional updates to the subject software appliance. In step 428, processing can repeat, return to a prior processing point, jump to a further processing point, or end.

The foregoing description is illustrative, and variations in configuration and implementation may occur to persons skilled in the art. For example, while embodiments have been generally described as involving a software appliance as the software object being updated, in other embodiments other software or resources can be updated according to systems and methods described herein. For instance, export module 118 and other resources can update conventional software applications, applets, components of an operating system, or an operating system itself. For further example, while export module 118 has been generally described as being hosted on client 102, in embodiments export module 118 can be hosted remotely, for instance as a Web service or Web application. In further embodiments, export module 118 can be embedded in the updated version of the software appliance available to be downloaded from appliance server 112, or other source. Other resources described as singular or integrated can in embodiments be plural or distributed, and resources described as multiple or distributed can in embodiments be combined. The scope of the invention is accordingly intended to be limited only by the following claims.

What is claimed is:

1. A method, comprising:
   instantiating, by a processor of a client device, a first version of a software appliance;
   receiving, from a user of the software appliance, user-inputted data that is used by the first version of the software appliance during operation;
   capturing an image of the first version of the software appliance comprising an initial configuration state;
   aggregating one or more changes to the initial configuration state to produce a current configuration state of the first version of the software appliance;
   registering, by the processor of the client device, the current configuration state and the user-inputted data of the first version of the software appliance;
   instantiating, by the processor of the client device, a second version of the software appliance; and
   exporting, by the processor of the client device, the current configuration state and the user-inputted data of the first version of the software appliance to the second version of the software appliance.

2. The method of claim 1, wherein registering comprises registering the initial configuration state and initial user-inputted data.

3. The method of claim 2, wherein registering comprises registering the one or more changes to the initial configuration state and one or more changes to the initial user-inputted data of the first version of the software appliance.

4. The method of claim 3, wherein exporting comprises aggregating the one or more changes to the initial configuration state and the one or more changes to the user-inputted data to export the current configuration state and current set of user-inputted data to the second version of the software appliance.

5. The method of claim 1, wherein exporting comprises invoking a schema tool to conform the user-inputted data to a schema of the second version of the software appliance.

6. The method of claim 5, wherein the schema tool pre-fills data values in the user-inputted data to conform to the schema of the second version of the software appliance.

7. The method of claim 5, wherein the schema tool presents a dialog to the user to select data values to insert in the user-inputted data to conform to the schema of the second version of the software appliance.

8. The method of claim 1, wherein the second version of the software appliance is downloaded over a network.

9. The method of claim 1, wherein the first version of the software appliance is archived or deleted after instantiation and configuration of the second version of the software appliance.

10. A system, comprising:
    a memory comprising instructions;
    a processor, operably connected to the memory, the processor configured to execute the instructions comprising:
    receiving, from a user of the software appliance, user-inputted data that is used by a first version of the software appliance during operation,
    capturing an image of the first version of the software appliance comprising an initial configuration state;

aggregating one or more changes to the initial configuration state to produce a current configuration state of the first version of the software appliance;

registering the current configuration state and the user-inputted data of the first version of software appliance, and exporting the complete current configuration state and the user-inputted data of the first version of the software appliance to a second version of the software appliance upon instantiation of the second version of the software appliance.

11. The system of claim 10, wherein the registering comprises registering the initial configuration state and initial user-inputted data.

12. The system of claim 11, wherein the registering comprises registering the one or more changes to the initial configuration state and one or more changes to the initial user-inputted data of the first version of the software appliance.

13. The system of claim 12, wherein the exporting comprises aggregating the one or more changes to the initial configuration state and the one or more changes to the user-inputted data to export the current configuration state and current set of user-inputted data to the second version of the software appliance.

14. The system of claim 10, wherein the exporting comprises invoking a schema tool to conform the user-inputted data to a schema of the second version of the software appliance.

15. The system of claim 14, wherein the schema tool pre-fills data values in the user-inputted data to conform to the schema of the second version of the software appliance.

16. The system of claim 14, wherein the schema tool presents a dialog to the user-inputted to select data values to insert in the user-inputted data to conform to the schema of the second version of the software appliance.

17. The system of claim 10, wherein the second version of the software appliance is downloaded over a network.

18. The system of claim 10, wherein the first version of the software appliance is archived or deleted after instantiation and configuration of the second version of the software appliance.

19. A non-transitory computer-readable medium, the computer-readable medium being readable to execute a method comprising:

instantiating, by a processor of a client device, a first version of a software appliance;

receiving, from a user of the software appliance, user-inputted data that is used by the first version of the software appliance during operation;

capturing an image of the first version of the software appliance comprising an initial configuration state;

aggregating one or more changes to the initial configuration state to produce a current configuration state of the first version of the software appliance;

registering, by the processor of the client device, the current configuration state and the user-inputted data of the first version of the software appliance;

instantiating, by the processor of the client device, a second version of the software appliance; and exporting, by the processor of the client device, the current configuration state and the user-inputted data of the first version of the software appliance to the second version of the software appliance.

20. The computer-readable medium of claim 19, wherein the registering comprises registering the initial configuration state and initial user-inputted data.

21. The computer-readable medium of claim 20, wherein registering comprises registering the one or more changes to the initial configuration state and the one or more changes to the initial user-inputted data of the first version of the software appliance.

22. The computer-readable medium of claim 21, wherein exporting comprises aggregating the one or more changes to the initial configuration state and one or more changes to the user-inputted data to export the current configuration state and a current set of user-inputted data to the second version of the software appliance.

23. The computer-readable medium of claim 19, wherein exporting comprises invoking a schema tool to conform the user-inputted data to a schema of the second version of the software appliance.

* * * * *